United States Patent [19]
Jain et al.

[11] Patent Number: 5,559,888
[45] Date of Patent: Sep. 24, 1996

[54] SECURE INFORMATION RETRIEVAL SERVICE (SIRS)

[75] Inventors: Ajay Jain, Holmdel; Paramdeep S. Sahni; Alok K. Gupta, both of Marlboro, all of N.J.

[73] Assignee: Lucent Technologies Inc., Murray Hill, N.J.

[21] Appl. No.: 196,961

[22] Filed: Feb. 15, 1994

[51] Int. Cl.⁶ .................................................. H04L 9/00
[52] U.S. Cl. ................................ 380/25; 380/4; 380/23
[58] Field of Search .................................. 380/4, 23–25, 380/44, 45

[56] References Cited

U.S. PATENT DOCUMENTS

| | | | |
|---|---|---|---|
| 4,310,720 | 1/1982 | Check, Jr. ................................ | 380/4 |
| 4,326,098 | 4/1982 | Bouricius et al. ....................... | 380/25 |
| 4,799,153 | 1/1989 | Hann et al. ....................... | 340/825.34 |
| 4,827,508 | 5/1989 | Shear ........................................ | 380/4 |
| 4,845,739 | 7/1989 | Katz ........................................ | 379/92 |
| 4,918,728 | 4/1990 | Matyas et al. .......................... | 380/25 |
| 4,920,567 | 4/1990 | Malek ...................................... | 380/23 |
| 4,926,476 | 5/1990 | Covey ...................................... | 380/4 |
| 4,956,769 | 9/1990 | Smith ....................................... | 380/25 |
| 4,965,804 | 10/1990 | Trbovich et al. ....................... | 386/45 |
| 4,977,594 | 12/1990 | Shear ........................................ | 380/4 |
| 5,003,598 | 3/1991 | Kurstadt .................................. | 380/44 |
| 5,048,087 | 9/1991 | Trbovich et al. ....................... | 380/44 |
| 5,050,207 | 9/1991 | Hitchcock .............................. | 379/96 |
| 5,050,213 | 9/1991 | Shear ........................................ | 380/25 |
| 5,166,977 | 11/1992 | Ross ........................................ | 380/18 |
| 5,191,611 | 3/1993 | Lang ........................................ | 380/25 |
| 5,410,598 | 4/1995 | Shear ........................................ | 380/25 |

OTHER PUBLICATIONS

M. Satyanarayanan, "Integrating Security in a Large Distributed System", ACM Transactions on Computer Systems, vol. 7, No. 3, Aug. 1989, pp. 247–280.

*Primary Examiner*—Salvatore Cangialosi

[57] ABSTRACT

A secure information retrieval system comprising three levels of confidential access to a database, wherein the first level is stored and transmitted in an unencrypted form, the second level is stored in an encrypted form but transmitted in an unencrypted form, and the third level is stored and transmitted in an encrypted form.

12 Claims, 3 Drawing Sheets

SECURE INFORMATION RETRIEVAL SERVICE (SIRS)

FIELD OF THE INVENTION

This invention relates to a system for securely storing and selectively transmitting sensitive information. More particularly, the invention relates to a system incorporated into a conventional data or voice transmission network that includes a secure repository for storing the sensitive information and means to selectively deliver the information from the repository to an authorized caller.

DESCRIPTION OF THE PRIOR ART

Storing and transmitting information electronically has become an accepted mode of operating for both the business and private sector. On-line public databases exist which are accessed through conventional telephone lines.

In addition means have been developed for releasing stored information only after appropriate identification has been produced. Typically, when telephone lines are used to access databases a billing or identification number must be inserted, usually by DTMF tones, to access the information in the data base.

Thus there is available in the prior art large capacity storage devices to maintain and accumulate data, transmission networks to deliver the information from the database to a subscriber and means for releasing the information only after appropriate identification has been provided.

In addition conventional means exist for encrypting information before storing the information and for decrypting the information after releasing the information from storage.

SUMMARY OF THE INVENTION

The subject invention provides a system for storing and securing sensitive and confidential information.

The system also provides means for only authorized individuals to access the information. Further, the system provides means to secure the sensitive and confidential information at a plurality of discrete levels, each level being accessible by an individual depending on his/her level of authorization.

The system includes a computer connected within the telephone transmission network. The computer interfaces with the network through standard telephone switching means that enable access to information in the computer upon entry of the proper identification code. The system is programmed to recognize a plurality of levels of authorization. Identification code is provided respectively for marginally sensitive information, sensitive information and highly confidential information. The program releases information from the computer as a function of the authorization code.

The sensitive information and highly confidential information is stored in an encrypted format for security purposes, while the marginally sensitive information is stored in the usual fashion. The sensitive information is decrypted prior to transmission to the authorized caller, but the highly confidential information is delivered to the user in the same encrypted form as it is stored, thereby enabling only a telephone receiver equipped with the required decoding means to be able to convert the information to understandable and usable form.

DESCRIPTION OF THE DRAWINGS

The system of the present invention will be better understood when considered with the following drawings wherein.

DESCRIPTION OF THE PREFERRED EMBODIMENT

The present invention has application in the storage in a database and transmission upon authorized request of sensitive information. Individual, personal, medical, financial, legal and personal information that must be maintained and periodically provided that serve the individuals are illustrations of records that have particular application in the system.

Figure 1:
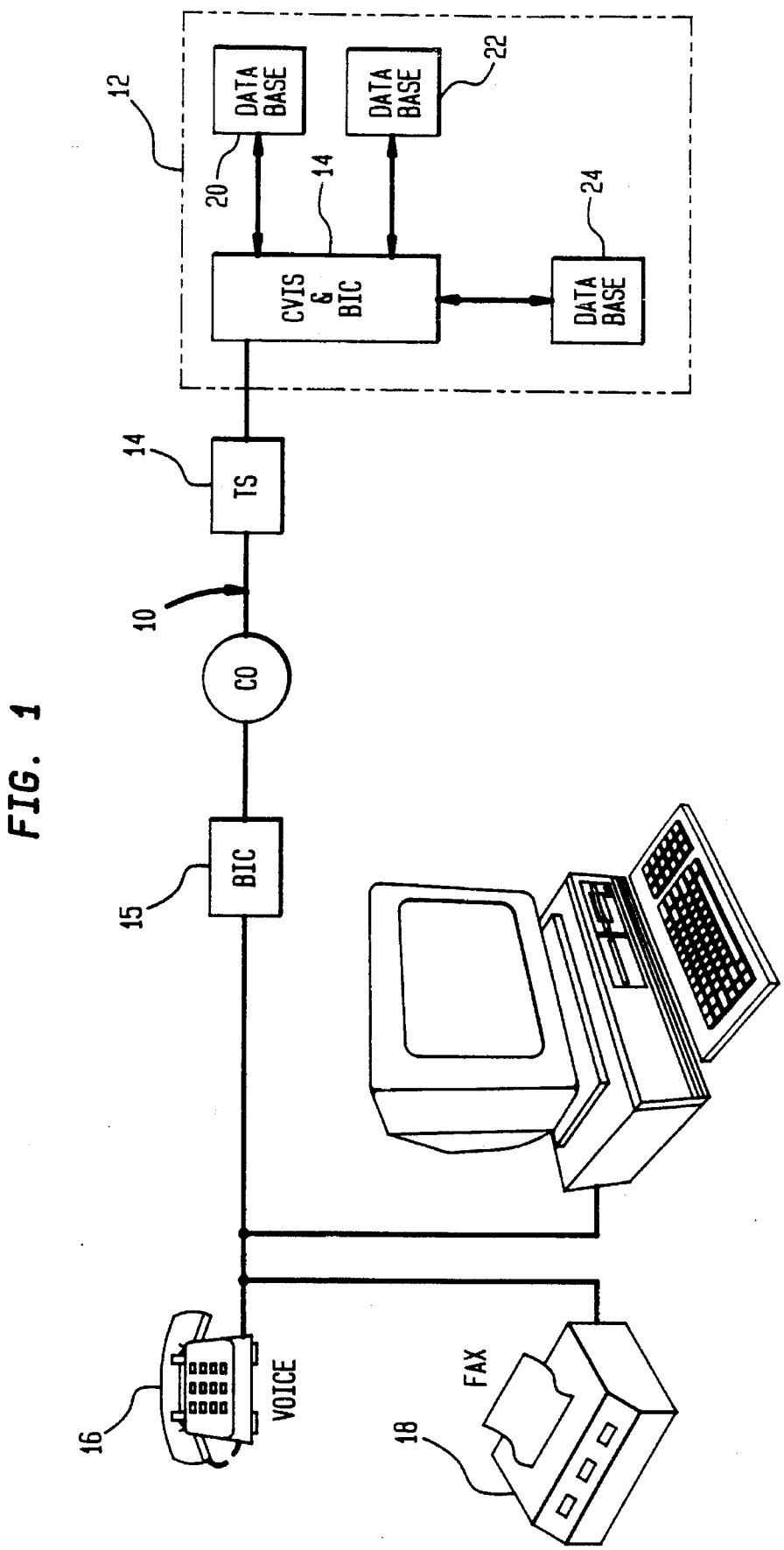
FIG. 1 is the overall schematic of the system.

As seen in FIG. 1, an existing conventional telephone network 10 such as the AT&T network is provided with a high capacity secure storage computer 12 and means 14 to interface between the network 10 and the computer 12. In addition, a decrypting means 15 is provided at the appropriate user's location (e.g. installed in his/her phone set) to decode information provided to the caller in encrypted form.

The particularly suitable repository 12 is a NCR 3000 gigabyte computer. The interface means 14 is a 4ESS switch programmed to respond to requests from the conventional network receiver such as telephones 16 or facsimile machines 18.

The computer 12 is illustrated in FIG. 1 as having three discrete data bases 20, 22 and 24 for storing information and data having varying degrees of confidential sensitivity. These databases need not necessarily reside on separate computers or storage devices but may be integrated on one device.

Basic to the invention is the capability of the system to enable selective access to the information stored in the data bases 20, 22 and 24. Illustratively, when the system is employed to store and transmit medical records, data base 20 will store the regular formal information pertaining to a patient such as birth date, insurance carrier, etc., which is desired to be marginally sensitive. Data base 22 will store more sensitive information such as the test ordered and the duties performed. Data base 24 will store the highly confidential information such as the diagnostic results or interpretation by physicians. The selection of which level of security the particular information is stored is a function of the subscriber's requirements.

The control programs for the computer 12 will allow access to the information in data base 20 to anyone having a Security Category 1 identification number that can be entered into the telephone network by depressing the touch tone keypad, which transmits conventional DTMF tones. Only information stored in data base 20 will be transmitted in response to an inquiry entering a Security Category 1 identification number. The information is not stored in encrypted format and will be transmitted in uncoded usable form.

The control program for the system will allow access to the information in data base 22 only to persons having a Security Category 2 identification number that can be entered into the network by conventional DTMF tones. The information in data base 22 is stored in encrypted form but is delivered to the caller with Security Category 2 identification in uncoded usable form. The delivery of information from data base 22 will always carry the patient's information stored in data base 20.

The control program for the system will allow access to the information in data base 24 only to persons having a Security Category 3 identification number that can be entered into the network by conventional DTMF tones. The information in data base 24 is highly confidential and is stored and also transmitted in encrypted form. The information from data base 24 reaches the caller in encrypted form and must be decoded at the caller's facility for use. The patient information stored in data bases 20 and 22 are always provided with the information from data base 24.

The decrypting means 15, which is used only to decode highly confidential information sent in encrypted form to the authorized user, may be an integral part of the user's telephone set. Optionally, decrypting means 15 may be a separate "blackbox" add on component.

Figure 2:
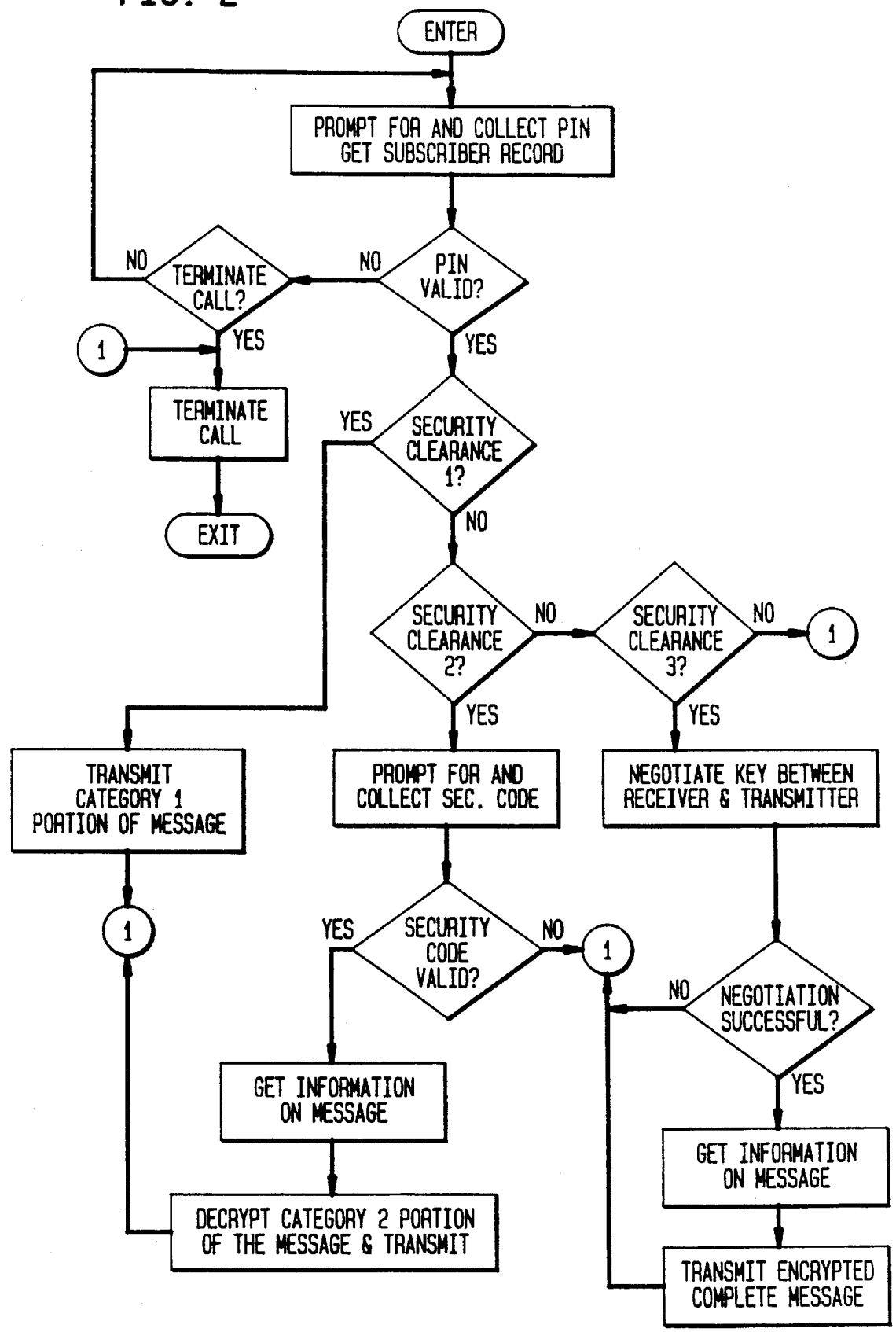
FIG. 2 is a flow chart of the software that controls the delivery of securely stored information to an authorized caller.

As seen in FIG. 2, the flow chart for verification of the validity of the caller and transmission of the proper data in response to the particular Security Category identification number proceeds from entry of an identification number to either termination of a call or delivery of selected information.

Figure 3:
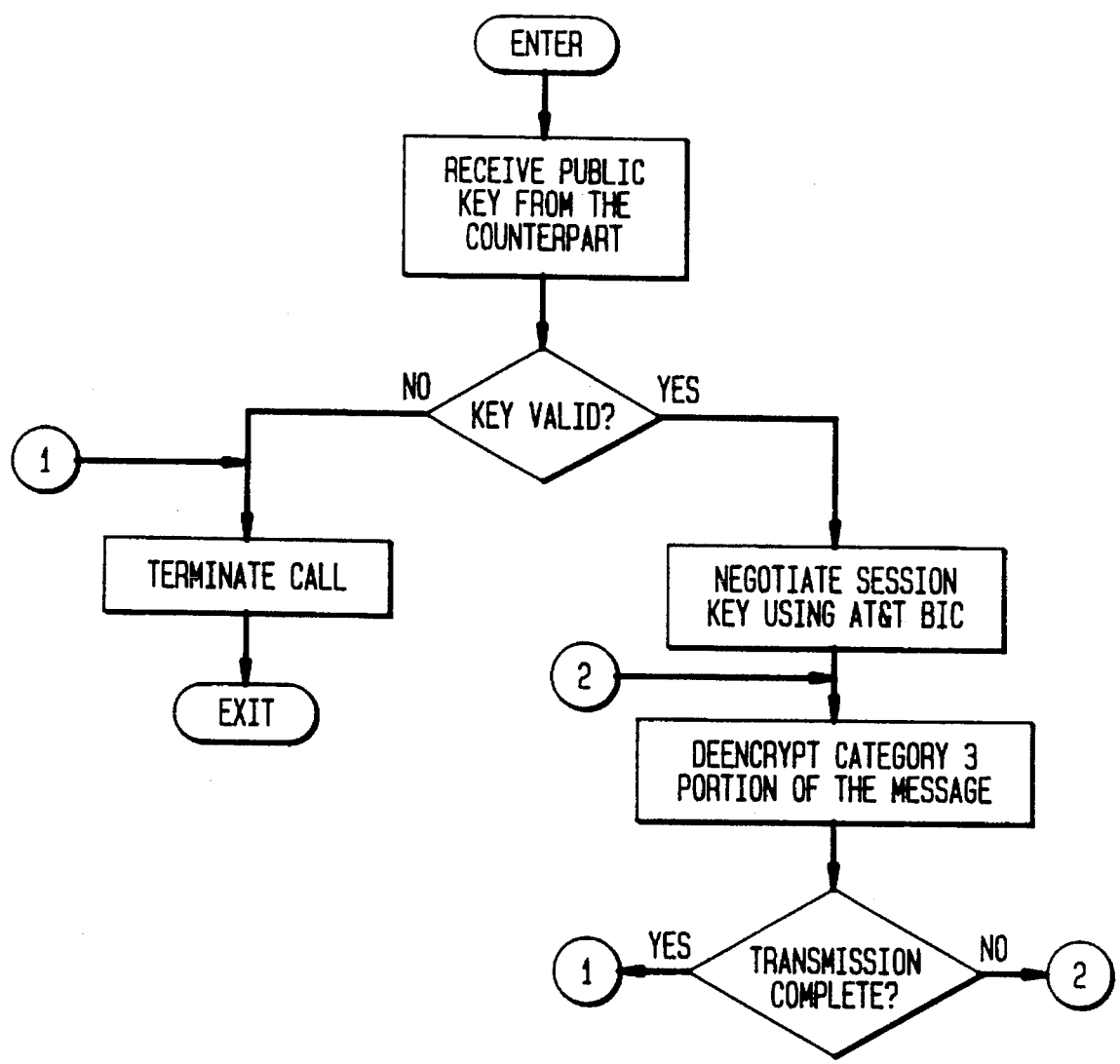
FIG. 3 is a flow chart of a program for decoding highly confidential information delivered to a caller in encrypted form.

The decryption of a Security Category 3 message is performed in the BIC decoder 15. A suitable program provided for decryption is the AT&T BIC program shown in FIG. 3.

The database 24 will also maintain record of successful as well as unsuccessful attempts on a given information. The record will consist of caller ID, time and date. This record will be available to the depositer of the information on demand or automatically. The system administrator can also request information for security reason but only of unsuccessful attempts.

An example of the use of the system of the invention to access information is as follows:

Dr. A has determined that it is necessary for him to have the case history of patient B.

Dr. A's secretary will dial 800-222-3333 (her identification number) from a standard conventional telephone to access the data stored in AT&T Network by computer 12. She obtained by on-line transmission the summary of all the test results received to that day because she has clearance to access Security Category 1 data.

Dr. A will dial in with his AT&T security device after reviewing the report from the secretary. The call will be secured and the information will be transmitted after verification of identity. The information will be encrypted until it reaches Dr. A's handset. The decoding will take place based on the key and algorithm. The data transmitted is of the Security Category 3.

I claim:

1. A system for securely storing data and selectively transmitting the stored data over a network comprising:
   (a) means for storing data in a plurality of separate data storage devices,
      wherein said means for storing data comprises means for encrypting and decrypting data,
      and wherein said plurality of separate data storage devices comprises:
      (i) a first set of data storage devices each containing data in unencrypted form,
      (ii) a second set of data storage devices each containing data in encrypted form, and
      (iii) a third set of data storage devices each containing data in encrypted form;
   (b) means for accessing the data stored in said plurality of separate data storage devices,
      wherein said means for accessing data permits access to the data stored in said first set of data storage devices in response to the proffer of any of a first set of authorization commands,
      and wherein said means for accessing data permits access to the data stored in said second set of data storage devices and the data stored in said first set of data storage devices in response to the proffer of any of a second set of authorization commands,
      and wherein said means for accessing data permits access to the data stored in said third set of data storage devices and the data stored in said second set of data storage devices and the data stored in said first set of data storage devices in response to the proffer of any of a third set of authorization commands;
   (c) means for transmitting over said network the data accessed by said means for accessing the data stored in said plurality of separate data storage devices,
      wherein said means for transmitting data produces and transmits a composite data signal comprising the data accessed from said first set of data storage devices, said second set of data storage devices and said third set of data storage devices in response to a particular authorization command taken from the group of authorization commands consisting of said first set of authorization commands, said second set of authorization commands, and said third set of authorization commands,
      and wherein said composite data signal comprises:
      (i) unencrypted data from said first set of data storage devices,
      (ii) data from said second set of data storage devices which is decrypted by said means for encrypting and decrypting data, and
      (iii) encrypted data from said third set of data storage devices,
      when said particular authorization command is any of said third set of authorization commands; and
   (d) means for receiving said composite data signal transmitted by said means for transmitting the data stored in said plurality of separate data storage devices comprising:
      (i) means for proffering said particular authorization command to said means for accessing data,
      (ii) means for decrypting the encrypted data of said composite data signal, and
      (iii) and means for displaying the data of said composite data signal.

2. The system for securely storing data and selectively transmitting the stored data over a network of claim 1 wherein said means for proffering said particular authorization command is a Dual Tone Multiple Frequency telephone keypad.

3. The system for securely storing data and selectively transmitting the stored data over a network of claim 1 wherein said means for displaying the data of said composite data signal comprises said means for decrypting the encrypted data of said composite data signal.

4. The system for securely storing data and selectively transmitting the stored data over a network of claim 1 wherein said means for displaying the data of said composite data signal is a telephone.

5. The system for securely storing data and selectively transmitting the stored data over a network of claim 1 wherein said means for displaying the data of said composite data signal is a facsimile machine.

6. The system for securely storing data and selectively transmitting the stored data over a network of claim 1 wherein said means for displaying the data of said composite data signal is a personal computer.

7. The system for securely storing data and selectively transmitting the stored data over a network of claim 1 wherein said means for displaying the data of said composite data signal comprises a telephone, a facsimile machine and a personal computer.

8. The system for securely storing data and selectively transmitting the stored data over a network of claim 1 wherein said composite data signal comprises audio data.

9. The system for securely storing data and selectively transmitting the stored data over a network of claim 1 wherein said composite data signal comprises image data.

10. The system for securely storing data and selectively transmitting the stored data over a network of claim 1 wherein said composite data signal comprises American Standard Code for Information Interchange (ASCII) data.

11. The system for securely storing data and selectively transmitting the stored data over a network of claim 1 wherein said composite data signal comprises, audio data, image data and American Standard Code for Information Interchange (ASCII) data.

12. The system for securely storing data and selectively transmitting the stored data over a network of claim 1, further comprising means for capturing the telephone number from which said means for receiving proffers a particular authorization command, the date of the proffered authorization command and the time of the proffered authorization command, and wherein at least one of said third set of data storage devices maintains a record of said telephone number, date and time.

\* \* \* \* \*